(12) United States Patent
Toliyat et al.

(10) Patent No.: US 7,049,786 B1
(45) Date of Patent: May 23, 2006

(54) UNIPOLAR DRIVE TOPOLOGY FOR PERMANENT MAGNET BRUSHLESS DC MOTORS AND SWITCHED RELUCTANCE MOTORS

(75) Inventors: Hamid A. Toliyat, College Station, TX (US); Tilak Gopalarathnam, Campbell, CA (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 10/723,426

(22) Filed: Nov. 25, 2003

Related U.S. Application Data

(60) Provisional application No. 60/429,163, filed on Nov. 25, 2002.

(51) Int. Cl.
*H02P 7/05* (2006.01)
(52) U.S. Cl. .................... 318/701; 318/254; 318/727
(58) Field of Classification Search ............... 318/254, 318/700, 701, 439, 720–724, 138, 13
See application file for complete search history.

(56) References Cited

U.S. PATENT DOCUMENTS

| | | | | |
|---|---|---|---|---|
| 4,684,867 A * | 8/1987 | Miller et al. | ................. | 318/701 |
| 5,115,181 A * | 5/1992 | Sood | .......................... | 318/701 |
| 5,258,901 A * | 11/1993 | Fraidlin | ........................ | 363/15 |
| 5,359,276 A * | 10/1994 | Mammano | ................... | 323/207 |
| 5,424,624 A * | 6/1995 | Senak, Jr. | .................... | 318/701 |
| 5,668,466 A * | 9/1997 | Vinciarelli et al. | ......... | 323/282 |
| 5,689,164 A * | 11/1997 | Hoft et al. | .................... | 318/701 |
| 5,703,456 A * | 12/1997 | Cox | .......................... | 318/701 |
| 5,705,918 A * | 1/1998 | Davis | .......................... | 322/94 |
| 5,764,019 A * | 6/1998 | Webster | ....................... | 318/701 |
| 5,945,801 A * | 8/1999 | Yamada et al. | ............. | 318/701 |
| 5,952,738 A * | 9/1999 | Miller | ......................... | 307/116 |
| 6,014,001 A * | 1/2000 | Guinet | ........................ | 318/701 |
| 6,054,819 A * | 4/2000 | Pengov | ....................... | 318/254 |
| 6,166,500 A * | 12/2000 | Makaran | ..................... | 318/254 |
| 6,191,564 B1 * | 2/2001 | Mao | .......................... | 323/222 |
| 6,341,076 B1 * | 1/2002 | Kadatskyy et al. | ...... | 363/56.12 |
| 6,342,772 B1 * | 1/2002 | Gallegos-Lopez et al. | .. | 318/701 |
| 6,384,564 B1 * | 5/2002 | Pollock | ...................... | 318/701 |
| 6,528,964 B1 * | 3/2003 | Schulz et al. | ............... | 318/701 |
| 6,611,127 B1 * | 8/2003 | Arimitsu et al. | ............ | 318/801 |
| 6,646,407 B1 * | 11/2003 | Rahman et al. | ............. | 318/701 |
| 6,734,646 B1 * | 5/2004 | Aiello et al. | ................. | 318/254 |
| 6,850,029 B1 * | 2/2005 | Pollock et al. | .............. | 318/727 |
| 6,864,561 B1 * | 3/2005 | Iyer et al. | ................... | 257/634 |

OTHER PUBLICATIONS

Krishnan, R. Lee S., Uninterruptible Motor Drives: A Case Study with Switched Reluctance Motors, Sep. 5-9, 1994, IEEE, Industrial Electronics, Control and Instrumentation, 1994, IECO International Conference. pp. 220-225, vol. 1.*

(Continued)

*Primary Examiner*—David Martin
*Assistant Examiner*—Robert Horn
(74) *Attorney, Agent, or Firm*—Baker Botts L.L.P.

(57) ABSTRACT

A unipolar drive includes a booster, an energy storage module, and a unipolar inverter. The booster increase a voltage received from a power supply to produce an energy output. The energy storage module store at least some of the energy output by the booster. The unipolar inverter energizes windings of a motor using energy from the booster and returns energy from the windings to the booster when the windings are not being energized.

15 Claims, 4 Drawing Sheets

OTHER PUBLICATIONS

Krishnan, R. Lee S., PM Brushless DC Motor Drive With A New Power Converter Topology,Industry Applications Conference, 1995. Thirtieth IAS Annual Meeting, IAS '95., Publication Date: Oct. 8-12, 1995 vol.: 1 On pp. 380-387, vol. 1.*

Cheng, K.W.E. Yeung, Y.P.B. Tang, C.Y. Xue, X.D. Sutanto, D., Topology analysis of switched reluctance drivess, Power Electronics and Variable Speed Drives, 2000. Eighth International Conference on (IEE Publ. 475), Sep. 18-19, 2000, pp. 512-517.*

T. Gopalarathnam, H.A. Toliyat, "Input Current Shaping in BLDC Motor Drives Using a New Converter Topology," IECON'OI: The 27th Annual Conference of the IEEE Industrial Electronics Society.

T. Kenjo and S. Nagamori, *Permanent-Magnet and Brushless DC Motors*. Oxford, UK: Clarendon Press, 1985.

J.R. Hendershot Jr. and T.J.E. Miller, *Design of Brushless Permanent Magnet Motors*. Hillsboro, OH: Magna Physics Publishing, 1994.

R. Krishnan and S. Lee, "PM Brushless DC Motor Drive with a new Power Converter Topology," in *Conf. Rec. IEEE IAS Annu. Meeting*, Oct. 1995, pp. 380-387.

R. Krishnan and P. Vijayraghavan, "A New Power Converter Topology for PM Brushless DC Motor Drives," in *Conf. Rec. IEEE IECON*, 1998, vol. 2, pp. 709-714.

R. Krishnan, "A Novel Single Switch per Phase Converter Topology for Four-Quadrant PM Brushless DC Motor Drive," in *Conf. Rec. IEEE IAS Annu. Meeting*, Oct. 1996, vol. 1, pp. 311-318.

J. Sebastián, M. Jaureguizar and J. Uceda, "An Overview of Power Factor Correction in Single-Phase Off-Line Power Supply Systems," in *Conf. Rec. IEEE IECON*, 1994, vol. 3, pp. 1688-1693.

J. Skinner and T.A. Lipo, "Input Current Shaping in Brushless DC Motor Drives Utilizing Inverter Current Control," in *Proc. Fifth Intl. Conf. On Electrical Machines and Drives*1991, pp. 121-125.

R.P. Massey and E.C. Snyder, "High Voltage Single-Ended DC-DC Converter," in *Conf. Rec. IEEE PESC*, 1977, pp. 156-159.

D.S.L. Simonetti, J. Sebastián and J. Uceda, "The Discontinuous Conduction Mode SEPIC and Cuk Power Factor Preregulators: Analysis and Design," *IEEE Trans. Indl. Electr.*, vol. 44, No. 5, pp. 630-637, Oct. 1997.

T. Gopalarathnam, S. Waikar, H.A. Toliyat, M.S. Arefeen and J.C. Moreira, "Development of Low-Cost Multi-Phase Brushless DC (BLDC) Motors with Unipolar Current Excitations," in *Conf. Rec. IEEE IAS Annu. Meeting*, Oct. 1999, pp. 173-179.

J. Sebastián, J. Uceda, J.A. Cobos, J. Arau and F. Aldana, "Improving Power Factor Correction in Distributed Power Supply Systems Using PWM and ZCS-QR SEPIC Topologies," in *Proc. IEEE PESC*, 1991, pp. 780-791.

F.S. Dos Reis, F. Antunes, J. Sebastián and J. Uceda, "Influence of the Control Method in the PFP Converter Size," in *Conf. Rec. ISIE*, 1997, pp. 365-370.

R. Krishnan and S. Lee, "PM Brushless DC Motor Drive with a new Power Converter Topology," Conf. Record, IEEE-IAS Annual Meeting, pp. 380-387, 1995.

R. Krishnan, "A Novel Single Switch per Phase Converter Topology for Four-Quadrant PM Brushless DC Motor Drive," Conf. Rec. of the IEEE-IAS Annual Meeting, 1996, vol. 1, pp. 311-318.

V. Grigore, J. Kyyra and J. Rajamaki, "Input Filter Design for Power Factor Correction Converters Operating in Discontinuous Conduction Mode," IEEE International Symposium on Electromagnetic Compatibility, 1999, vol. 1, pp. 145-150.

* cited by examiner

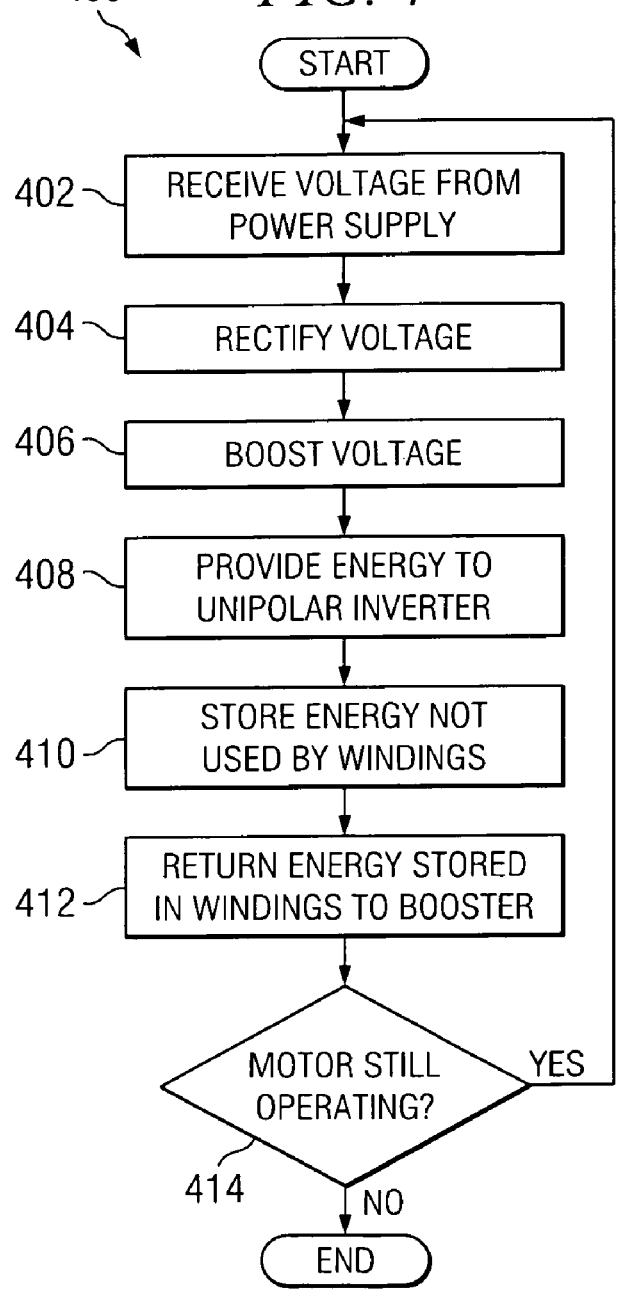

UNIPOLAR DRIVE TOPOLOGY FOR PERMANENT MAGNET BRUSHLESS DC MOTORS AND SWITCHED RELUCTANCE MOTORS

RELATED APPLICATIONS

This application claims the benefit under 35 U.S.C. section 119(e) of the priority of U.S. Provisional Application No. 60/429,163, filed Nov. 25, 2002, entitled "Low-Cost Brushless DC Motor Drive with Improved Power Factor."

TECHNICAL FIELD OF THE INVENTION

The present invention relates generally to the field of motor drives and, more particularly, to a unipolar drive topology for permanent magnet brushless DC motors and switched reluctance motors.

BACKGROUND OF THE INVENTION

Cost minimization is important to the large volume manufacture and application of Brushless DC (BLDC) motors and Switched Reluctance Motors (SRMs) in variable speed drives. BLDC motors are conventionally excited with bipolar currents that require a six-switch inverter. The unipolar motor needs fewer electronic parts and uses a simpler circuit than the bipolar motor. For these reasons, unipolar-driven motors are widely used in low- cost instruments. The savings in converter cost opens up many applications for variable speed drives (VSD) such as HVAC, fans, pumps and appliances, which have been dominated by constant speed drives.

A simple unipolar drive includes a single switch in series with each winding and a Zener diode or dump resistor in the freewheeling path. This drive is inefficient because the stored energy in the phases is dissipated. Better performance may be obtained by using topologies that have previously been used for driving Switched Reluctance Motors (SRM). An example is the C-dump converter, which offers full regenerative control. However, it has the disadvantage of requiring a complicated control for the dump capacitor voltage, the failure of which could be catastrophic. A buck converter-based drive for the unipolar BLDC motor has also been proposed. Both these topologies require a higher voltage on the dump capacitors than what is applied to the motor phases during turn-on. While this is a requirement for the SRM motor in order to achieve a fast turn-off of the phase current to avoid negative torque spikes, it is not so for the BLDC motor. A three- switch converter for the unipolar BLDC motor for ac supply operation was investigated, but it requires a modification in the machine windings and a split- capacitor voltage balancing control scheme.

For applications requiring operation from the utility supply, it is important to design the equipment to satisfy harmonics standards such as the IEC 1000-3-2, which limit the magnitude of current harmonics that can be injected into the utility. These standards are typically not satisfied by the conventional method of AC/DC conversion using a bridge rectifier followed by a large DC bus capacitor. Passive Power Factor Correction (PFC) circuits based on the use of reactive elements are impractical in 50–60 Hz single-phase lines because of size, weight and cost. Active PFC methods are becoming increasingly popular because of the availability of low- cost switches. They include a DC—DC converter between the diode bridge and the bulk capacitor, which is controlled such that the input current is shaped to follow the input voltage. The frequency spectrum of the input current would then consist of the fundamental plus easily filtered higher order harmonics. For low power levels, the extra cost and complexity of the additional PFC stage is not justified by the improvement in power factor.

SUMMARY OF THE INVENTION

In accordance with one embodiment of the present invention, a unipolar drive includes a booster, an energy storage module, and a unipolar inverter. The booster increase a voltage received from a power supply to produce an energy output. The energy storage module store at least some of the energy output by the booster. The unipolar inverter energizes windings of a motor using energy from the booster and returns energy from the windings to the booster when the windings are not being energized.

In accordance with another embodiment of the present invention, a method for driving a motor includes receiving a voltage input from a power supply, boosting the voltage received from the power supply, and energizing windings of the motor using the boosted voltage. The method further includes storing at least some of the energy not used by the windings to excite the motor and returning at least some of the energy stored in the windings to the booster when the windings are not being energized.

Important technical advantages of certain embodiments of the present invention include low-cost unipolar inverters. Certain embodiments of the present invention use a smaller number of switches than bipolar drives. This allows drives to be manufactured more cheaply, and provides advantages in situations where low- cost motors are advantageous, such as household appliances. In addition, differences in relative capability and quality of performance between such low-cost drives and conventional drives is not significant for many applications using low-cost drives.

Other important technical advantages of certain embodiments of the present invention include improved power factor over many conventional motors. Certain embodiments of the present invention store energy during the operation cycle of the motor and return energy that is frequently wasted in conventional unipolar drives, thus allowing a power factor near unity. This allows more efficient use of power, reducing the overall cost of operating the motor.

Still other technical advantages of the present invention include ground-referenced switches in the unipolar inverter. A motor drive according to one embodiment of the invention overcomes the disadvantage of using one or more high-side referenced switches in the converter topology. By using all ground-referenced switches, it simplifies the gate drive requirements and enables a low-cost and compact packaging.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
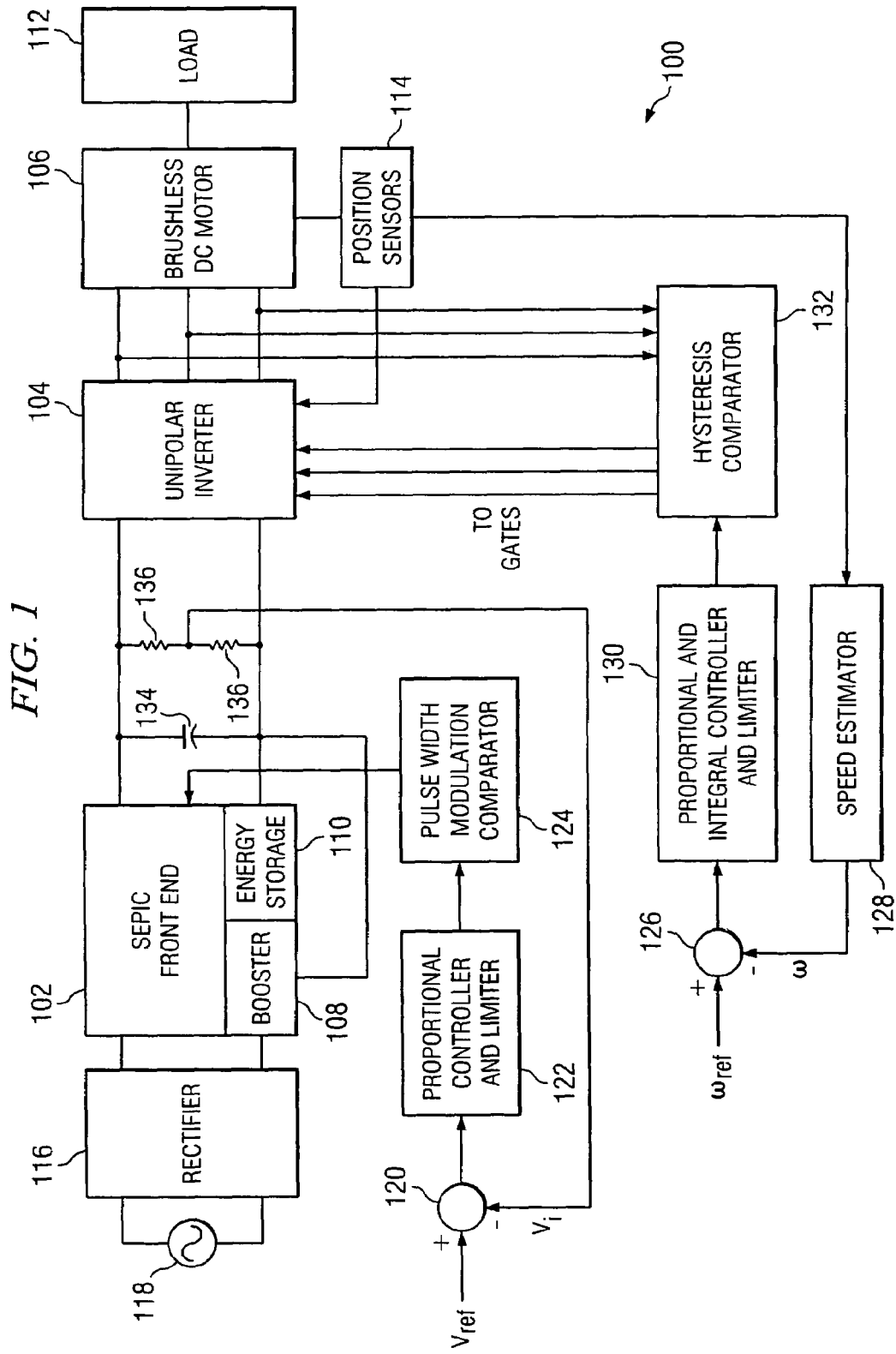
FIG. 1 is a schematic diagram of a particular embodiment of a unipolar drive topology for an electric motor.

FIG. 1 illustrates a unipolar drive 100 for an electric motor 106. In the depicted embodiment, drive 100 includes a single-ended primary inductance converter (SEPIC) front-end 102 coupled to a unipolar inverter 104. Front-end 102 and unipolar inverter 104 in turn drive motor 106, which is mechanically coupled to a load 112 driven by motor 106. In general, drive 100 uses power received from a power supply 118 to drive motor 106 in a consistent and controlled manner. Position sensors 114 provide information about the operation of motor 106, thus allowing feedback to adjust the motor 106 in a suitable manner to preserve smooth operation.

SEPIC front-end 102 is a circuit that maintains a smooth flow of energy to drive motor 106. In the depicted embodiment, front-end 102 includes a booster 108 and energy storage 110. Booster 108 increases voltage received from power supply 118 through rectifier 116 to a certain level. This level is determined by a reference voltage ($V_{ref}$) that may be selected to be any suitable level for insuring a consistent level of performance and output from front-end 102. Booster 108 may also buck the voltage to keep it below a certain level, which may be useful when the windings of motor 106 are in certain states of back-EMF. Energy storage 110 maintains energy at times when it is not needed by unipolar inverter 104 to drive motor 106. Energy storage 110 provides energy back to booster 108 in order to allow booster 108 to maintain a consistent power level.

Unipolar inverter 104 includes switches coupled to windings (inductive components) of motor 106. When windings are energized, motor 106 is driven by unipolar inverter 104. Switches in unipolar inverter 104 control the energy flow to windings, which in turn produce a back-EMF that removes energy from windings during the operation cycle. Unipolar converter 104 thus allows a motor 106 to be driven smoothly by incoming power from power supply 118.

Motor 106 may be any electric motor driven by unipolar inverter 104 to drive mechanical load 112, such as permanent magnet brushless DC motors (BLDCMs) or switched reluctance motors (SRMs). Motor 106 may include any of a variety of electric motors used in variable speed applications. BLDCMs and SRMs are common in high volume air conditioning (HVAC), fans, pumps, and appliances. The control and drive topology for motor 106 is particularly useful because it allows variable speed BLDCMs to be used in areas which traditionally have been dominated by constant speed drives.

Motor 106 is excited by unipolar excitation, a particular example of which may be described for the aforementioned surface-mount permanent magnet motor with concentrated stator windings. In such an embodiment of motor 106, the induced back-EMFs with respect to rotor position are trapezoidal with a flat-top width that is as wide as possible. Smooth torque production requires forcing a constant current through each phase winding when its back-EMF is at its peak value and turning off the current when the back-EMF is changing. This is accomplished in bipolar excitation by injecting positive current when the back-EMF is positive, and negative current when the back-EMF is negative, with each conduction period lasting 120°. This results in two phases conducting current and producing torque at any instant of time. In contrast, unipolar current conduction limits the phases to only one direction of current. Constant torque production is still possible because one phase is conducting current at any instant. It is of course possible to have an overlap in the phase conduction to have a smoother torque production.

Although unipolar excitation uses windings of motor 106 less efficiently, in that less output torque is produced for the same peak currents, it has several compensating advantages in terms of performance. First, there is only one device in series with each phase, minimizing conduction losses. Second, the risk of shoot-through faults resulting from changing current directions is eliminated. Third, switching of devices connected to the supply rails, which generally requires some isolation circuitry, can be avoided. In addition to these performance advantages, there is significant potential for reducing its cost. Typically, the inverter for a motor costs more than the motor itself, so the relative cost savings of reducing the number of components in the inverter may be significant.

Position sensors 114 monitor the location of rotor 106. The position information maintained by position sensors 114 may in turn be used to determine the speed of motor 106. This allows adjustment of the speed as necessary. In a particular embodiment, position sensors 114 are coupled to unipolar inverter 104 and a speed estimator 128. Speed estimator 128 calculates the speed of the motor 106 based on position measurements, allowing proper feedback to be determined for unipolar inverter 104 controlling motor 106.

Rectifier 116 and power supply 118 provide power to front-end 102 that is used to drive motor 106. In the depicted embodiment, power supply 118 represents any suitable source of alternating current power. Rectifier 116 converts AC power from power supply 118 to DC power, which is then used by front-end 102 to drive motor 106.

Feedback during the operation of motor 106 is provided by a variety of components. Front-end 102 is controlled based on a comparison of a voltage into inverter 104 performed by comparator 120. An intermediate capacitor 134 between front-end 102 and unipolar inverter 104 follows the input voltage from front-end 102. This input voltage is measured across resistors 136. The input voltage ($V_i$) is measured against $V_{ref}$ by comparator 120. Based on that comparison, a signal is provided to proportional controller and limiter, shown by box 122. This sets the level of output signal from comparator 120 to an appropriate value. The signal is then provided to pulse width modulation comparator 124, which in turn provides feedback to front-end 102 for adjustment of boosting level of booster 108.

Feedback on the speed of motor 106 is provided to inverter 104 to allow adjustment of drive 100. Position sensors 114 provide position information to speed estimator 128 which determines a frequency ($\omega$) for motor 109. Frequency $\omega$ is compared to a reference frequency ($\omega_{ref}$) by comparator 126. The results of this comparison are provided to proportional and integral controller and limiter, shown by box 130. This sets the output level of comparator 126 accordingly. The resulting signal is provided to hysteresis comparator 132. Hysteresis comparator 132 receives information about the drive signals provided to motor 106, and information about the frequency of the motion of motor 106 from box 130. Using this information, hysteresis comparator 132 controls gates of switches in unipolar inverter 104 to make suitable adjustments to the control of windings provided by unipolar inverter 104.

In operation, front-end 102 receives power signals from power supply 118 that have been rectified by rectifier 116. Front-end 102 appropriately boosts the power of these input signals using energy stored in energy storage 110. Front-end 102 provides a boosted output to intermediate capacitor 134 which in turn follows the input and provides it to unipolar inverter 104. Unipolar inverter 104 energizes windings of motor 106 to produce motion in load 112.

During operation, front-end is controlled by feedback from comparator 120. Thus, as the input voltage measured over intermediate capacitor 134 moves above or below a certain threshold, comparator 120 adjusts a switch in booster 108 to adjust level of boost provided by front-end 102. Similarly, using position information from position sensors 104, comparator 126 provides feedback to unipolar inverter 104 to obtain the correct frequency of motion in motor 106 by controlling the windings of motor 106.

Figure 2:
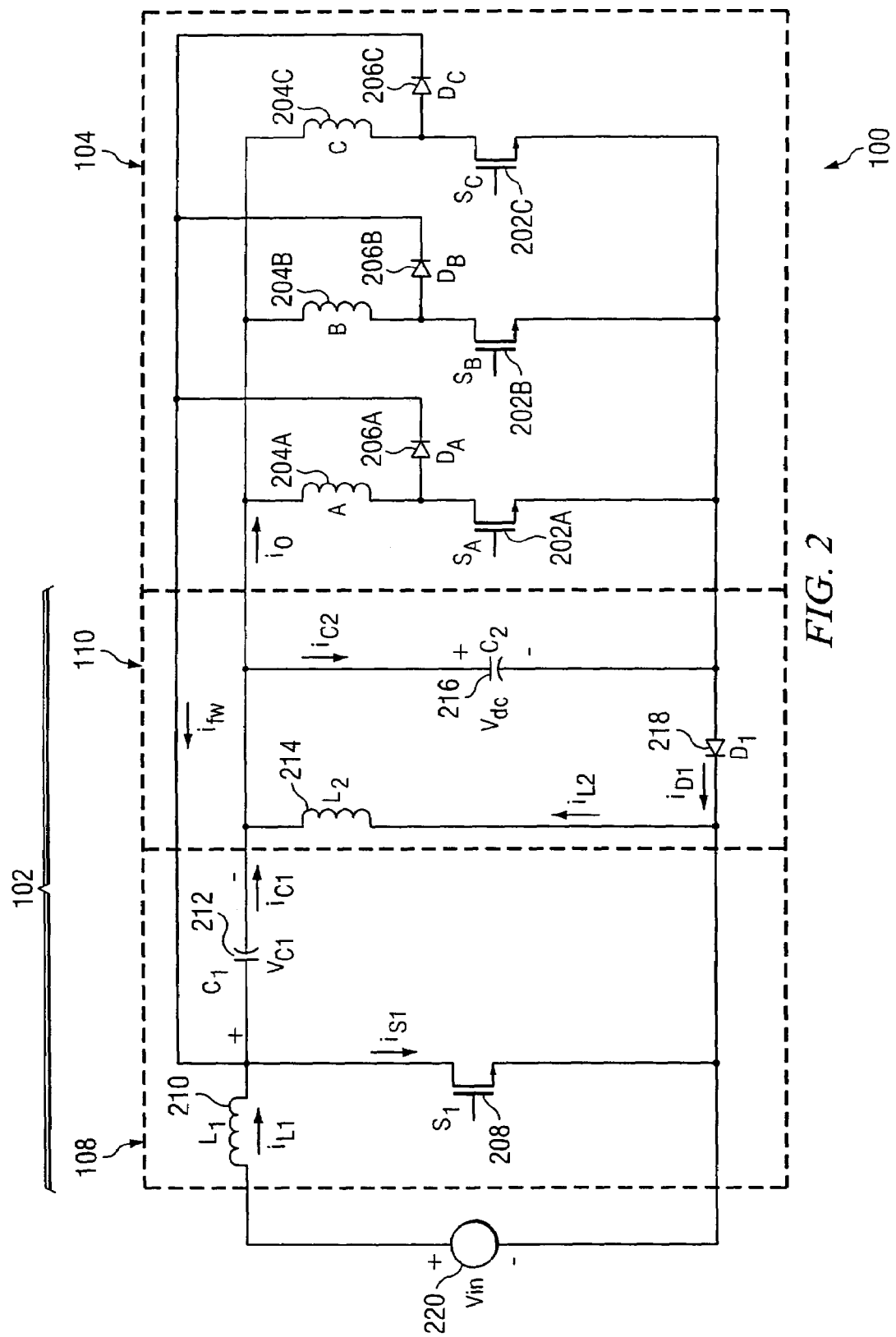
FIG. 2 shows a particular embodiment of a unipolar drive powered by a DC power supply.

FIG. 2 shows a particular embodiment of unipolar drive 100. Drive 100 includes unipolar inverter 104, booster 108, and energy storage 110. Booster 108 and energy storage 110 collectively form front-end 102. The particular arrangement of components shown is only one example of a circuit that can perform as unipolar drive 100, and other configurations that perform equivalent functions should be understood to be included in the associated description.

Unipolar inverter includes switches 202A, 202B, and 202C (collective referred to as "switches 202"), which control the energizing of windings 204A, 204B, and 204C (collectively referred to as "windings 204"), also known as "phases." Inverter 104 also includes diodes 206A, 206B, and 206C (collectively referred to as "diodes 206"), which provide energy back to booster 108 when windings 204 are discharged. This allows energy that might be lost in operation of motor 106 to be conserved for later use by drive 100. Switches 202 are shown as transistors which are switched on and off based on signals provided to their respective gates by hysteresis comparator 132. Thus, hysteresis comparator 132 controls operation of switches 202. When switches 202 are allow current to flow, energy flows through windings 204, thus energizing them. When switches 202 interrupt current flow, energy stored in windings 204 passes through diodes 206 back to booster 108.

In the depicted embodiment, booster 108 includes switch 208, inductor $L_1$ 210, and capacitor $C_1$ 212. Booster 108 is coupled to energy storage 110. Energy storage 110 is an LC tank that includes inductor $L_2$ 214, capacitor $C_2$ 216, and diode $D_1$ 218, which allows energy to flow from energy storage 110 back to booster 108. Drive 100 is powered by a DC power supply 220. Thus, rectifier 116 is not used in the depicted embodiment.

In operation, each phase is energized by turning on the corresponding switch in series with it. To regulate the current, switch 202A is turned off, which forces the turn-on of diode 206A, and the flow of current through $C_1$ 212. This applies a voltage of $-V_{C1}$ across the machine winding 204A, enabling a fast decay of the phase current. For proper demagnetization of phase 204A after each conduction interval and to prevent conduction during periods of negative back-EMF, the instantaneous value of $V_{C1}$ should be greater than the peak value of the back-EMF E, or $$V_{C1} > E \quad (1)$$

By applying Kirchoff's voltage law to front-end 102, the following equation is obtained:

$$V_{in} = V_{L1} + V_{C1} + V_{L2}$$

Since the average voltages in the two inductors 210 and 214 are zero, it follows that $$V_{in} = V_{C1} \quad (2)$$

From (1) and (2), the peak back-EMF is obtained at the maximum speed of motor 106, which is given by $E_{max} = V_{in}$, assuming that the ripple in the intermediate capacitor voltage is negligible. The maximum operating speed is then given by $$\omega_{max} = \frac{V_{in}}{K_e}$$

where $K_e$ is the phase back-EMF constant of the motor.

If motor 106 is operated beyond this speed, it would result in negative torque spikes because of conduction during periods of negative back-EMF.

The minimum voltage $V_{dc}$ required under these conditions in this embodiment is $$V_{dc} = E + IR_s + L_s \frac{dI}{dt},$$

where $R_s$ and $L_s$ are the phase resistance and inductance, and I is the phase current. At low speeds, when the back-EMF is low, the switching frequency of the phase switches increases in order to regulate the phase current. The switching frequency and hence the losses at low speeds can be minimized by bucking the input voltage to lower levels at the output $V_{dc}$. At higher speeds, the current regulator loses its ability to force current into the phases especially during turn-on because of the high back-EMF voltage. The ability of front-end 102 to boost the available input voltage makes it possible to maintain current-regulated operation of the drive at higher speeds. This feature makes the proposed topology particularly suitable for low voltage DC applications such as automotive circuits.

Front-end 102 can be designed for operation either in the Continuous Conduction Mode (CCM) or in the Discontinuous Conduction Mode (DCM). In CCM, its voltage conversion ratio is given by $$m = \frac{V_{dc}}{V_{in}} = \frac{D}{1-D},$$

where D is the duty cycle of the switch $S_1$.

In DCM, its voltage conversion ratio is given by $$m_d = \frac{V_{dc}}{V_{in}} = \frac{D}{\sqrt{K}},$$

where $$K = \frac{2L_1 L_2}{RT(L_1 + L_2)},$$

R being the equivalent load resistance and T the time period of switch $S_1$.

The boundary value of K between continuous and discontinuous conduction modes, $K_{crit}$ can be calculated ($m = m_d$) as:

$$K_{crit} = (1-D)^2$$

The converter operates in CCM when $K>K_{crit}$ and in DCM when $K<K_{crit}$. In both modes of operation, $V_{dc}$ can be regulated at a value higher (Boost operation) or lower (Buck operation) than the input voltage $V_{in}$. From the controls viewpoint, it is advantageous to have the converter operating in the same mode under all load conditions. In addition, the size of the inductors and hence the overall converter can be reduced if it is operated in DCM. Hence, it is proposed in one embodiment that the converter be designed for operation in the critical conduction mode at maximum load, so that it operates in DCM at rated load and all values less than rated load, but it should be understood that alternative embodiments in CCM or a combination of both modes are also possible.

Sample calculations for component values of the described DCM embodiment may be performed as well. In one example, a DCM embodiment of drive 100 is used to drive a commercially available fractional horsepower BLDC motor with a phase back-EMF constant of 12V/Krpm. Because of the low back-EMF constant, the input voltage is chosen to be 50V peak. A drive with a power rating of 100 W is designed. The following equations are used to design the component values [9]:

Input voltage $v_{ac}=50\sin(2\pi 60t)$ V

DC bus voltage $v_{dc}=24$ V

Switching frequency of $S_1$, $f_s=25$ KHz

Voltage conversion ratio $M=24/50=0.48$

Critical conduction parameter $K_{a,crit}=0.5/(M+1)^2=0.228$ $K_a=0.16$ is chosen to ensure DCM operation Duty cycle of $S_1$, $d=\sqrt{2M\sqrt{Ka}}=0.271$ Equivalent inductance $L_{eq}=RT_sK_a/2=28.8$ μH Input current ripple $I_{rip}=20\%\ 11=0.8$A $L_1=V_1dT_s/I_{rip}=677$ μH $L_2=L_1L_{eq}/(L_1-L_{eq})=30$ μH $C_1=1/(\omega^2(L_1+L_2))=5.8$ μF. Actual values of $C_1$ selected will be higher than the calculated value in order to reduce the voltage ripple caused by the freewheeling phase currents. A value around 10 μF would allow sufficient voltage stability for most applications.

In operation, booster 108 imparts a boost to the input power signal from power supply 220 according to the control provided by comparator 120 coupled to gate of switch 208. The amount of boost is controlled by opening and closing switch 208. This is also influenced by a freewheeling current ($i_{fw}$) returned from unipolar inverter 104 by diodes 206. Excess energy is stored in inductor $L_2$ 214 and capacitor $C_2$ 216. Energy from energy storage 110 may be provided to booster 108 through diode $D_1$ 218.

The energy provided from front-end 102 in turn energizes motor 106. The manner in which windings 204 are energized is controlled by switches 202. Switches 202 are in turn controlled by hysteresis comparator 132 which provides voltages to the gates of switches 202. As a result, motor 106 may be smoothly and efficiently driven by drive 100.

Figure 3:
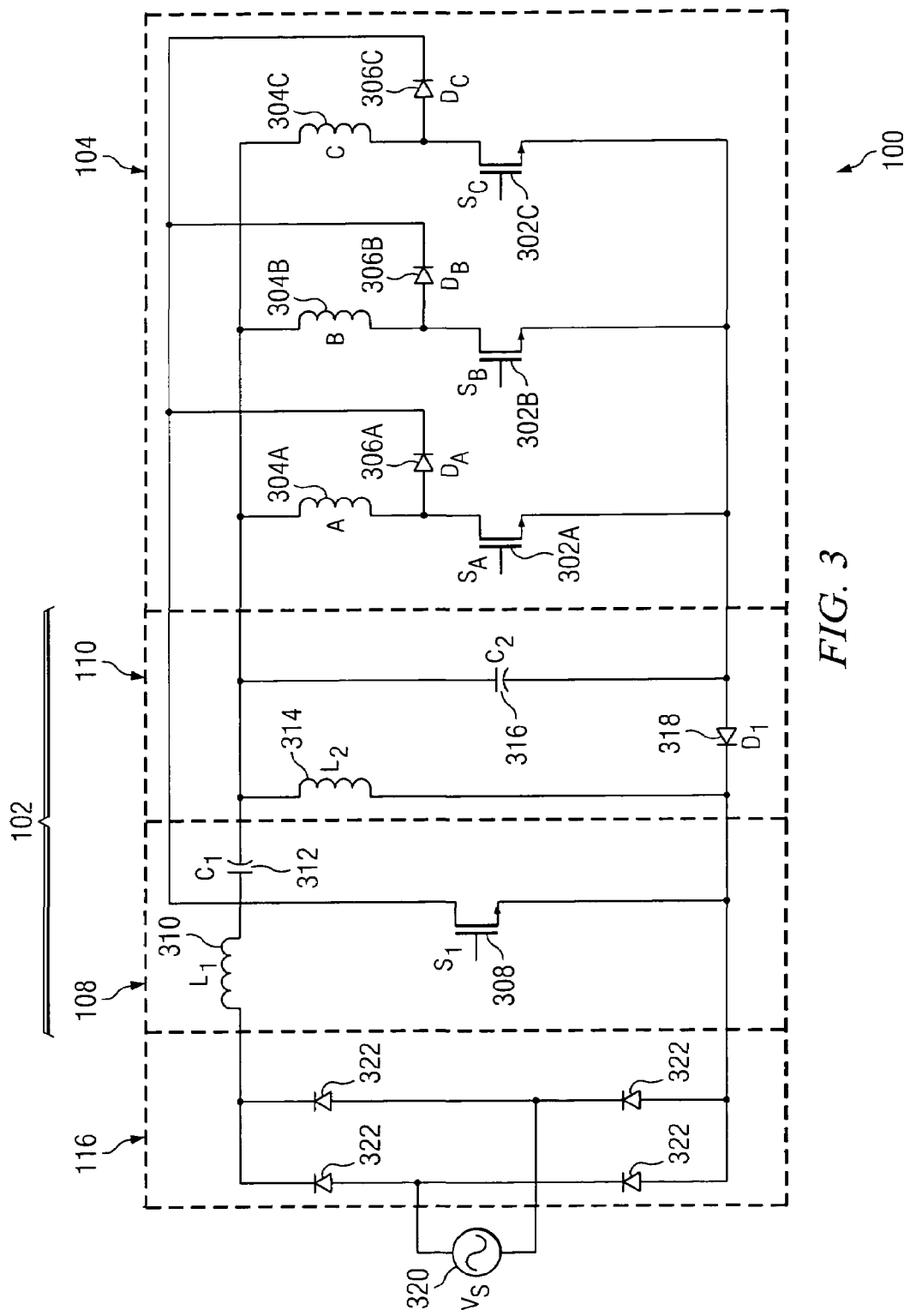
FIG. 3 shows a particular embodiment of a unipolar drive powered by an AC power supply.

FIG. 3 is an alternative embodiment of drive 100 driven by an AC power supply 320. In this case, rectifier 116 is used to convert AC power from AC power supply 320 to DC power. In the depicted embodiment, rectifier 116 includes four diodes 322 in the arrangement of a diode bridge. All other components of drive 100 are analogous to those described in FIG. 2. For example, switches 302 correspond to switches 202, windings 304 correspond to windings 204, and diodes 306 correspond to diodes 206. The operation of the depicted circuit is substantially the same apart from the fact that the DC voltage provided is rectified from AC power supply 320. It is notable, however, that the voltage is able to substantially follow the input voltage from AC power supply 320.

FIG. 4 shows an example method of operation for drive 100 powered by AC power supply 320. Drive 100 receives voltage from power supply 320 at step 402. Rectifier 116 rectifies the voltage signal from power supply 320 at step 404. Booster 108 boosts the voltage provided by power supply 320 at step 406. The resulting energy is used to power windings 304 at step 408. Energy not used by windings is stored by energy storage module at step 410. When windings are not being energized, energy from windings is returned to booster 108 using diodes 306 at step 412. These steps may be repeated as long as motor 106 is in operation, as shown by decision step 414. The particular method of operation described here is only one particular example, and any other method consistent with the description of drive 100 provided above may also be used.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A unipolar drive, comprising:
   a booster comprising a first transistor, a first capacitor coupled to a first transistor terminal of the first transistor, and a first inductor coupled to the first capacitor and the first transistor terminal of the first transistor;
   an energy storage module coupled to the booster, the energy storage module comprising a second inductor coupled to the first capacitor, a second capacitor connected coupled to the second inductor at a first capacitor terminal of the second capacitor, and a first diode coupled to a second transistor terminal of the first transistor and a second capacitor terminal of the second capacitor, wherein the energy storage module is operable to transfer energy from the second capacitor to the booster using the first diode;
   a unipolar inverter, comprising:
      a plurality of windings for a motor;
      a plurality of second transistors, each second transistor connected in series to one of the windings, and each second transistor operable to cause the respective winding to be energized; and
      a plurality of second diodes, each second diode coupled to one of the windings between the respective winding and the transistor in series with the winding, and each second diode operable to return energy from the respective winding to the energy storage module and the booster when the respective winding is not being energized;
   a voltage comparator operable to control the first transistor based on a comparison between an output voltage of the booster and a reference voltage; and
   a hysteresis comparator operable to control the second transistors based on a comparison between a reference frequency and a measured frequency of a motor driven by the unipolar drive.

2. A unipolar drive, comprising:
   a booster operable to increase a voltage received from a power supply to produce an energy output;
   an energy storage module operable to store at least some of the energy output by the booster; and a unipolar inverter operable to energize windings of a motor using energy from the booster, wherein the unipolar inverter is further operable to return energy from the windings to the booster when the windings are not being energized, wherein the unipolar inverter comprises:
  a plurality of transistors, each transistor coupled to a winding of the motor, and each transistor operable to cause the respective winding to become energized; and
  a plurality of diodes, each diode coupled to one of the windings, and each diode operable to carry energy from the windings to the booster when the windings are not being energized.

3. The unipolar drive of claim 2, further comprising a hysteresis comparator coupled to the transistors, the hysteresis comparator operable to:
  compare a frequency of the motor to a reference frequency; and
  control the transistors based on the comparison.

4. A method for driving a motor, comprising:
  receiving a voltage input from a power supply;
  boosting the voltage received from the power supply;
  energizing windings of the motor by unipolar inverter using the boosted voltage;
  storing at least some of the energy not used by the windings to excite the motor; and
  when the windings are not being energized, returning at least some of the energy stored in the windings via energy return diodes to the booster.

5. The method of claim 4, wherein the boosting step is performed by a booster comprising:
  a transistor;
  a capacitor coupled to the transistor; and
  an inductor coupled to the transistor and the capacitor.

6. The method of claim 5, further comprising:
  monitoring an output voltage of the booster;
  comparing the output voltage to a reference voltage; and
  controlling the transistor to adjust the output voltage of the booster based on the comparison.

7. The method of claim 4, wherein the energy is stored in an energy storage module, comprising:
  an inductor;
  a capacitor coupled to the inductor; and
  a diode coupled to the capacitor and the booster operable to carry energy from the capacitor to the booster.

8. The method of claim 4, wherein:
  the energizing step is controlled by a plurality of transistors; and
  the returning step is performed using a plurality of diodes coupled to the windings.

9. The method of claim 8, further comprising:
  monitoring a rotation frequency for the motor;
  comparing the rotation frequency to a reference frequency; and
  controlling the transistors based on the comparison.

10. The method of claim 4, wherein:
  the power supply supplies an AC voltage; and
  the method further comprises rectifying the AC voltage to produce a DC voltage.

11. A unipolar drive, comprising:
  a plurality of windings for a motor;
  a plurality of first transistors, each transistor coupled to one of the windings and operable to energize the respective winding;
  a plurality of first diodes, each diode coupled to one of the windings;
  an energy storage module comprising a first capacitor, a first inductor, and a second diode; and
  a booster coupled to the first diodes and the second diode, the booster comprising a second transistor, a second capacitor and a second inductor, wherein the booster is operable to receive energy from the windings and the energy storage module using the first diodes and the second diode respectively.

12. The unipolar drive of claim 11, further comprising a rectifier coupled to the booster, the rectifier comprising a diode bridge.

13. The unipolar drive of claim 11, further comprising a voltage comparator operable to control the second transistor based on a comparison of an output voltage of the booster to a reference voltage.

14. The unipolar drive of claim 11, further comprising a hysteresis comparator operable to control the first transistors based on a comparison of a rotation frequency of the motor to a reference frequency.

15. The unipolar drive of claim 11, wherein there are exactly three windings for the motor, exactly one first transistor coupled to each winding, and exactly one first diode coupled to each winding.

* * * * *